(12) United States Patent
Loccisano

(10) Patent No.: US 12,152,562 B2
(45) Date of Patent: Nov. 26, 2024

(54) WIND TURBINE WITH AERODYNAMIC FAIRINGS

(71) Applicant: Vincent Loccisano, Wellsley, MA (US)

(72) Inventor: Vincent Loccisano, Wellsley, MA (US)

( * ) Notice: Subject to any disclaimer, the term of this patent is extended or adjusted under 35 U.S.C. 154(b) by 0 days.

(21) Appl. No.: 18/489,505

(22) Filed: Oct. 18, 2023

(65) Prior Publication Data
US 2024/0167458 A1    May 23, 2024

Related U.S. Application Data

(60) Provisional application No. 63/384,479, filed on Nov. 21, 2022.

(51) Int. Cl.
   *F03D 13/25* (2016.01)
(52) U.S. Cl.
   CPC .................. *F03D 13/256* (2023.08)

(58) Field of Classification Search
   CPC ..................................... F03D 13/256
   See application file for complete search history.

(56) References Cited

U.S. PATENT DOCUMENTS

| | | | |
|---|---|---|---|
| 2016/0138567 A1* | 5/2016 | Loth | F03D 13/22 416/146 R |
| 2022/0128033 A1* | 4/2022 | Myers | F03D 9/257 |

* cited by examiner

*Primary Examiner* — Sean Gugger

(57) ABSTRACT

An apparatus for aligning flow entering a turbine rotor, and for straightening flow in the wake of a turbine rotor, is, in some embodiments, part of a structure that supports a nacelle and a turbine rotor. Neutral airfoil fairings on structural elements upwind of a rotor can mitigate the effect of side gusts and help straighten the flow entering a rotor. Neutral airfoil fairings on structural elements placed downwind of a rotor straighten turbulent flow in a turbine wake and increase the rate at which the wake dissipates. This enables increased energy extraction at the rotor as well as closer spacing of turbines in a field.

4 Claims, 3 Drawing Sheets

WIND TURBINE WITH AERODYNAMIC FAIRINGS

TECHNICAL FIELD

This disclosure relates in general to offshore wind turbines, and more specifically to an apparatus and method for providing a structure to support a turbine nacelle while affecting flow through a turbine rotor.

BACKGROUND

In wind farms, upstream turbines produce wakes that send turbulent air into downstream turbines, resulting in reduced electrical-power production. Adding to the reduced production, tip vortices from the upwind turbines produce high air speeds, causing high loads and increasing downwind turbine fatigue. To mitigate this effect, turbines are increasingly designed to alleviate wake turbulence. Mitigating turbulence allows turbines to be spaced more closely, increasing their number per square mile of wind farm, with the aim of improved net-power production.

Offshore wind turbines are commonly single-tower systems mounted to the seabed. Some float, using shallow submersible or semi-submersible platforms employing spars or spar buoys, tension legs, or a large-area barge-type constructions.

As a column of fluid flows through the rotor plane, a lift force occurs, redirecting fluid and causing induced drag. The redirection of fluid may include span-wise flow along the pressure side of the rotor blade radially, toward the blade tip. Fluid then flows over the opposite side of the blade. The fluid flow over the tips joins a chord-wise flow referred to as bypass flow, forming rotor-tip vortices. The rotor-tip vortices mix with vortices shed from the trailing edge of the rotor blade to form the rotor wake.

It is commonly known that rotor wake affects the rotor intake. A column of fluid encounters a rotor as an impediment in part because a portion of the fluid flowing around the rotor expands in the wake of the rotor in a form called stream column. Bypass flow, which is fluid flowing around the rotor plane, passes over the outer surface of the stream column. Since the stream column comprises what might be considered an infinite fore-body and an infinite after-body, the resulting pressure force on the stream column is zero (refer to D'Alembert's paradox). Increased lift over the rotor increases the amount of energy extracted from the stream column and creates slower-moving flow in the rotor wake, impeding flow through the rotor. This impediment increases the volume of rotor wake. Thus as more power is extracted at the rotor, the rotor stream column will expand and more fluid flow will bypass the rotor. As a result, maximum power is achieved from two opposing effects: that of increased power extraction, resulting in relatively lower flow rates; and that of reduced power-extraction, resulting in relatively higher flow rates.

An aerodynamic fairing, for the purpose of this disclosure, refers to a fairing having a wing-like or rudder-like form. In some embodiments an aerodynamic fairing is an airfoil which has a lift side and a pressure side, while in other embodiments an aerodynamic fairing is a neutral aerodynamic form being substantially symmetrical left side to right side.

In a wing-like form, air flowing over a lift surface creates lift and air flowing over the pressure surface creates pressure in the direction of the lift. A neutral aerodynamic fairing, also referred to as a rudder-like form, is an aerodynamic fairing with symmetrical surfaces, creating neither lift nor pressure. Air flowing over a neutral aerodynamic surface is directed with minimal drag over the surface.

As understood by one skilled in the art, a fluid is defined as any liquid, gas or combination thereof, be it water or air. Aerodynamic principles in the present disclosure may apply to any fluid including air.

SUMMARY

The present disclosure refers to an apparatus for aligning the flow entering a turbine rotor; for increasing the mass-flow through the rotor plane; for expanding the rotor wake; and for aligning the flow of a turbine rotor's wake.

In some embodiments, an aerodynamic fairing for a wind turbine comprises a moored floating wind turbine with multiple non-vertical shafts that support a rotor and generator. The rotor has a central axis surrounded by a rotor plane. The non-vertical shafts each have a long central axis. An elongate aerodynamic fairing has a long central axis, a lift surface and a pressure surface, engaged coaxially with a non-vertical shaft's central axis. The lift surface and the elongate aerodynamic fairing face the rotor's central axis. Airflow over the lift surface is directed into the rotor plane, providing increased mass flow through the rotor plane.

A moored floating wind turbine has a wide parallelogram base with a mooring hitch point. Shallow draft floats support four corners of the parallelogram. The shafts, each having a long central axis, each extend from a corner of the parallelogram to a rotor and a generator located above the parallelogram.

In some embodiments the apparatus is part of a structure that supports a nacelle and a turbine rotor. Neutral airfoil fairings built onto the support structures upwind of a rotor mitigate the effect of side gusts. Neutral airfoil fairings built onto the support structures downwind of a rotor can help straighten wake flow. These airfoil fairings straighten turbulent flow in the turbine wake to increase the rate at which the wake dissipates, allowing increased mass flow through the rotor for increased energy extraction at the rotor.

In another embodiment, airfoils with a pressure side facing away from the rotor center, and a lift side facing the rotor center, are built onto the support structures upwind of a rotor to direct increased mass-flow through the rotor plane. Such airfoils mitigate the effect of side gusts. Airfoil fairings built onto the support structures downwind of a rotor continue direct-bypass flow through the rotor and can widen the turbine wake to lower pressure behind the rotor. These airfoil fairings direct a wider column of wind through the rotor, and straighten turbulent flow in the turbine wake, to increase the rate at which the wake dissipates, allowing increased mass flow through the rotor for increased energy extraction at the rotor.

Mitigating turbulence allows turbines to be spaced more closely, increasing their number per square mile of wind farm, with the aim of improved net power production.

DESCRIPTION

Figure 1:
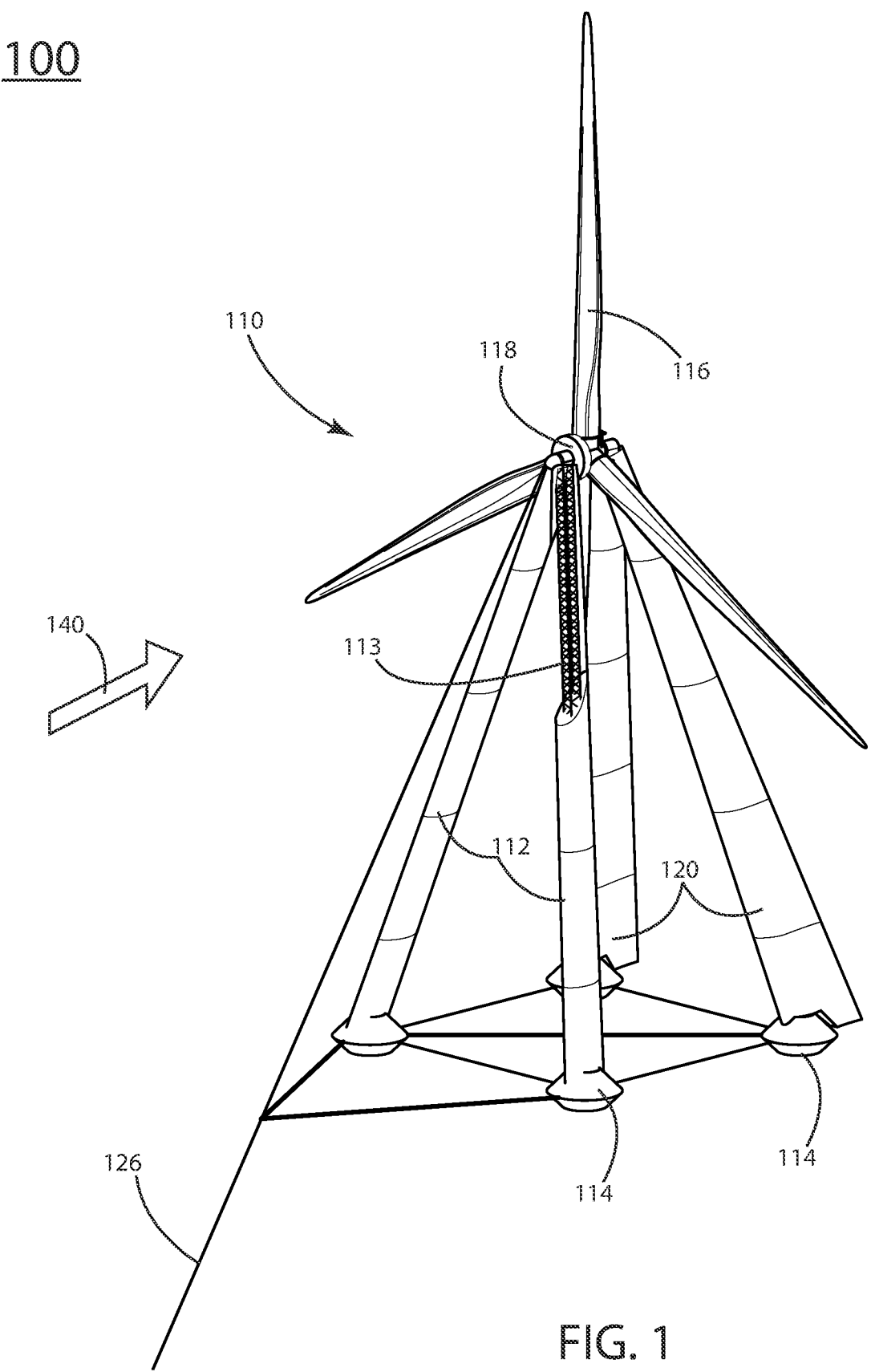
FIG. 1 is a perspective view of an example embodiment with the rotor plane directed into the wind.

In FIG. 1 an example embodiment 100 is an offshore wind turbine 110 having a rotor 116 and electrical-generation equipment 118. The rotor 116 rotates about a horizontal axis at its center. The area covered by the rotating rotor 116 is referred to as a rotor plane. In an example embodiment, the wind turbine 110 is moored by a line 126 to a permanent structure on the seabed. Towers 113 and floats 114 form a structural support system. It may be said that the towers 113, also referred to as shafts 113 are non-vertical, as they reside at an angle between floats 114 to electrical-generation equipment 118. Neutral aerodynamic fairings 112 cover front towers 113. Towers 113 and rear towers may also be referred to as shafts. Rearward, neutral, aerodynamic fairings 120 cover rear towers. It may be said that a long central axis of the aerodynamic fairings 120 are parallel with the long central axis of the towers 113 that they cover. One skilled in the art is familiar with structural supports 113 and understands how similar support structures may be enclosed by neutral aerodynamic fairings 120. Wind direction during normal operation flows perpendicular to the rotor plane, parallel to the rotor central axis, and is shown by arrow 140. One skilled in the art understands that objects in front of the rotor may be said to be upwind of the rotor and objects behind the rotor may be said to be down wind of the rotor.

Figure 2:
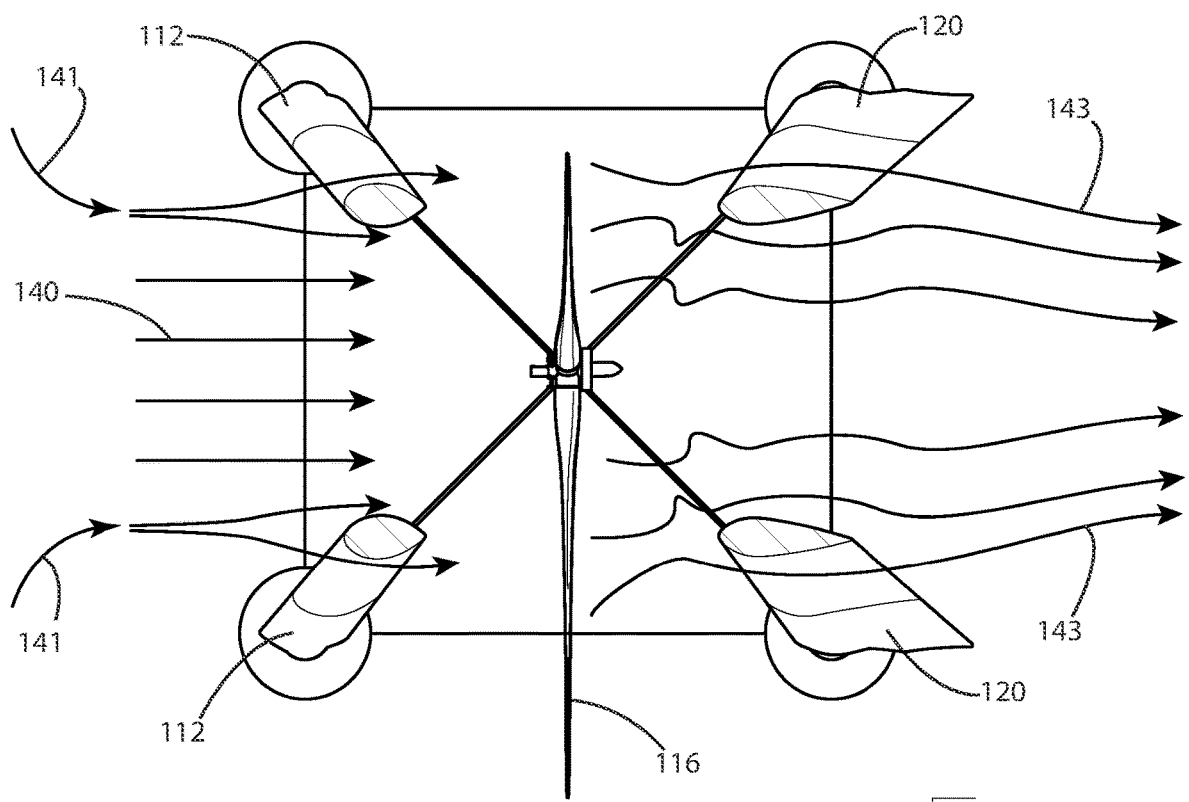
FIG. 2 is a cross-section, detail view thereof.
Figure 2:
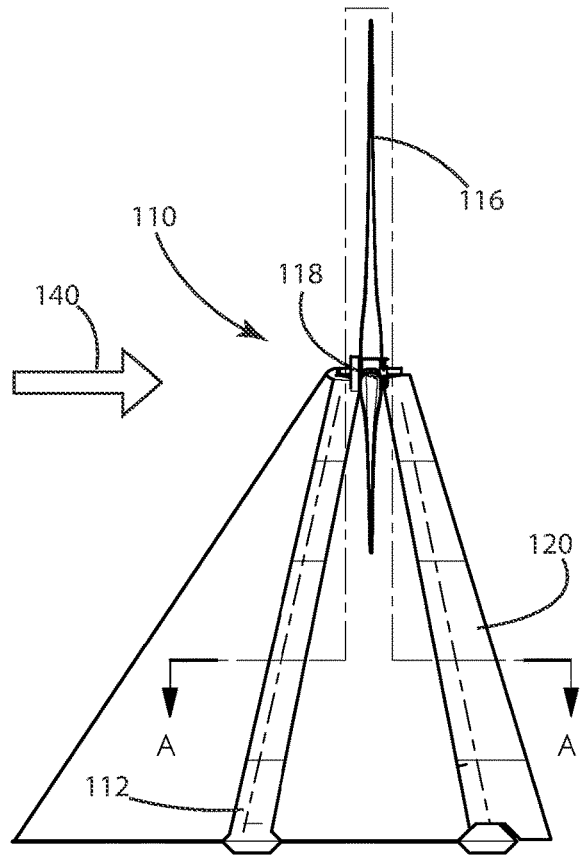

FIG. 2 is a cross-section showing the aerodynamic cross-sections of fairings 112 and 120. The aerodynamic fairing 112 is a substantially symmetrical form that aligns a portion of the wind stream 140 through a rotor 116. In some examples, off-axis or side gusts 141 are momentary winds not aligned with a prevailing stream 140 encountering a turbine 110. The forward aerodynamic fairings 112 help align the wind with the rotor 116 to turn side gusts into the prevailing-stream direction 140. Rear aerodynamic fairings 120 help straighten the turbulent flow 143 in the wake. Straightened wake flow may help dissipate the wake, relieving the effect of an impediment in the fluid stream, enabling more mass flow through the rotor, and greater energy extraction. Resulting, faster wake-dissipation may allow turbines in a field to be spaced closer together than those without flow-straightening aerodynamic fairings 120.

Figure 3:
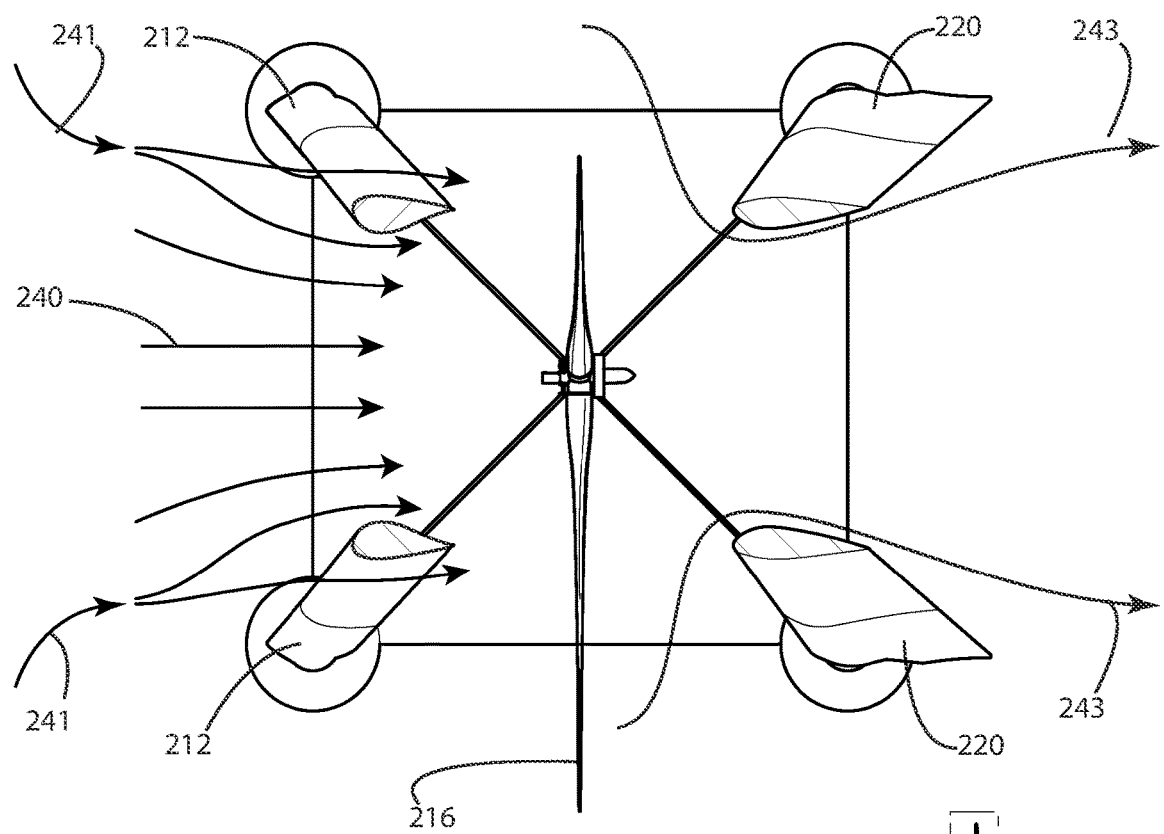
FIG. 3 is an iteration of the embodiment.
Figure 3:
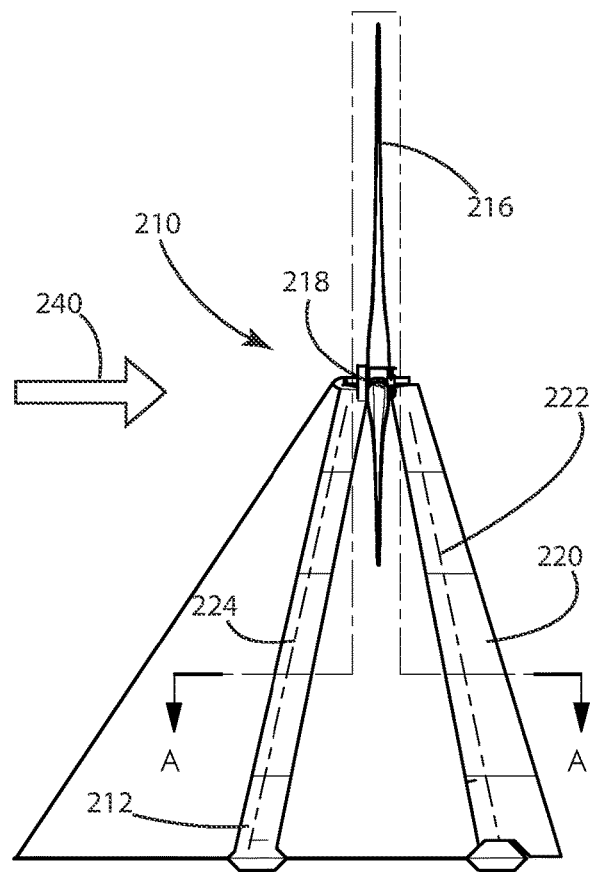

FIG. 3 is a cross-section of an iteration 200 showing the aerodynamic cross-sections of fairings 212 and 220. The aerodynamic fairing 212 is an airfoil form with the lift surface facing the rotor center. The lift over the airfoil draws a relatively wider portion of the wind stream 240 through the rotor 216. Flow stream 241 demonstrates additional mass flow drawn into the prevailing stream 240 encountering the rotor 216. Rear aerodynamic fairings 220 draw flow that would have otherwise bypassed the rotor through the rotor plane and help straighten the turbulent flow in the wake. Reference numbers 210 and 218 show the same parts as like numbers in iteration 100.

The invention claimed is:

1. An aerodynamic fairing for a wind turbine comprising:
  a moored floating wind turbine having at least two non-vertical shafts supporting a rotor and a generator; and
  said rotor having a central axis and a rotor plane surrounding said central axis; and
  said non-vertical shafts each having a long central axis; and
  at least a first elongate aerodynamic fairing having a long central axis, a lift surface and a pressure surface, engaged coaxially with at least one of said at least two non-vertical shaft central axis upwind of said rotor and said generator; and
  at least a second elongate aerodynamic fairing having a long central axis, a lift surface and a pressure surface, engaged coaxially with at least one of said at least two non-vertical shaft central axis upwind of said rotor and said generator; and
  said lift surface on said at least a first, and said at least a second, elongate aerodynamic fairing faces the rotor central axis; wherein
  airflow over said lift surface is directed into said rotor plane providing increased mass flow through said rotor plane.

2. The aerodynamic fairing for a wind turbine of claim 1 further comprising:
  said at least a first, and said at least a second, elongate aerodynamic fairing each pivotally engaged with said at least two non-vertical shafts about said aerodynamic fairing central axis and said coaxial non-vertical shaft central axis; wherein
  off-axis gusts are turned to a direction that is parallel with said rotor central axis.

3. The aerodynamic fairing for a wind turbine of claim 1 further comprising:
  said moored floating wind turbine having at least two non-vertical shafts supporting said rotor and generator, upwind of said rotor and generator, and at least two non-vertical shafts supporting said rotor and generator downwind of said rotor and generator; and
  said at least a first, and said at least a second, elongate aerodynamic fairing are engaged with each of said at least two upwind non-vertical shafts; and
  at least a third and at least a fourth, elongate aerodynamic fairing are engaged with each of said at least two downwind non-vertical shafts; wherein
  said upwind aerodynamic fairings direct wind into said rotor plane and said downwind aerodynamic fairings cause increased suction through said rotor plane and introduce high-speed air into a rotor wake.

4. An aerodynamic fairing for a wind turbine comprising:
  a moored floating wind turbine having a wide base that is a parallelogram further comprising a mooring hitch point engaged with said parallelogram; and
  shallow draft floats supporting four corners of said parallelogram; and
  at least four shafts, each having a long central axis and each extending from a corner of said parallelogram to a rotor and a generator located above said parallelogram; and
  said rotor having a horizontal, central axis and a rotor plane surrounding said horizontal, central axis; and
  at least two of said at least four shafts, upwind of said rotor and generator, and at least two of said at least four shafts, downwind of said rotor and said generator; and
  at least four elongate aerodynamic fairings, each having a long central axis, a lift surface and a pressure surface, engaged coaxially with said at least four shafts long central axis;
  said lift surface on at least said upwind elongate, aerodynamic fairings faces the rotor central axis;
  wherein said upwind aerodynamic fairings direct wind into said rotor plane, and
  said downwind aerodynamic fairings cause increased suction through said rotor plane and introduce high speed air into a rotor wake.

* * * * *